(12) United States Patent
Unger

(10) Patent No.: US 10,793,409 B2
(45) Date of Patent: Oct. 6, 2020

(54) LIFTING LOADS WITH LIFTING DEVICES

(71) Applicant: Entro Industries, Inc., Hillsboro, OR (US)

(72) Inventor: Brian Unger, Hillsboro, OR (US)

(73) Assignee: ENTRO INDUSTRIES, INC., Hillsboro, OR (US)

( * ) Notice: Subject to any disclaimer, the term of this patent is extended or adjusted under 35 U.S.C. 154(b) by 430 days.

(21) Appl. No.: 15/807,176

(22) Filed: Nov. 8, 2017

(65) Prior Publication Data

US 2019/0016575 A1  Jan. 17, 2019

Related U.S. Application Data

(60) Provisional application No. 62/531,742, filed on Jul. 12, 2017.

(51) Int. Cl.
*B66F 11/04* (2006.01)
*B62D 57/032* (2006.01)
(Continued)

(52) U.S. Cl.
CPC ............... *B66F 11/04* (2013.01); *B60S 9/205* (2013.01); *B62D 57/032* (2013.01); *B66F 3/44* (2013.01);
(Continued)

(58) Field of Classification Search
None
See application file for complete search history.

(56) References Cited

U.S. PATENT DOCUMENTS 1,001,299 A   8/1911  Page
1,242,635 A   10/1917 Anderson
(Continued)

FOREIGN PATENT DOCUMENTS

CA   2871406   11/2014
CA   2798743   8/2015
(Continued)

OTHER PUBLICATIONS

Notice of Pending Litigation Under 37 CFR 1.56 Pursuant to Granted Request for Prioritized Examination Under 37 CFR 1.102€(1), Jun. 28, 2016.
(Continued)

*Primary Examiner* — Gregory J Toatley, Jr.
*Assistant Examiner* — Terence E Stifter, Jr.
(74) *Attorney, Agent, or Firm* — Schwabe Willaimson & Wyatt

(57) ABSTRACT

A control system detects a loaded state for a lifting device. The control system receives a current load value from a load sensor corresponding to a load on the lifting device and compares the current load value from a previously received load value to determine a change in load. The control system receives a current displacement value from a displacement sensor corresponding to a displacement of the lifting device and compares the current displacement value with a previously received displacement value to determine a change in displacement. The control system compares the change in load with the change in displacement to determine a current load slope. The lifting device in identified in a loaded state based on a comparison of the current load slope with a load slope threshold. The control system may stop extending the lifting device after reaching the loaded state and start extending all of the lifting devices in unison to lift the load off of a base surface after all of the lifting devices reach the loaded state.

20 Claims, 9 Drawing Sheets

(51) Int. Cl.
*B60S 9/205* (2006.01)
*B66F 3/44* (2006.01)
*B66F 3/46* (2006.01)
*B66F 7/20* (2006.01)
*B66F 7/16* (2006.01)
*B66F 7/06* (2006.01)
*B66F 7/10* (2006.01)
*B62D 51/06* (2006.01)
*B66F 7/28* (2006.01)

(52) U.S. Cl.
CPC .............. *B66F 3/46* (2013.01); *B66F 7/0625* (2013.01); *B66F 7/16* (2013.01); *B66F 7/20* (2013.01); *B62D 51/06* (2013.01); *B66F 7/10* (2013.01); *B66F 7/28* (2013.01)

(56) References Cited

U.S. PATENT DOCUMENTS

| | | |
|---|---|---|
| 1,289,207 A | 12/1918 | Leach |
| 1,429,551 A | 9/1922 | Anderson |
| 1,615,055 A | 1/1927 | Turner |
| 1,627,249 A | 5/1927 | Page |
| 1,692,121 A | 11/1928 | Grant |
| 1,879,446 A | 2/1931 | Page |
| 1,914,692 A | 6/1933 | Kakaska |
| 1,915,134 A | 6/1933 | MacPherson |
| 2,132,184 A | 10/1937 | Poche |
| 2,164,120 A | 6/1939 | Page |
| 2,247,782 A | 7/1941 | Martinson |
| 2,259,200 A | 10/1941 | Cameron et al. |
| 2,290,118 A | 7/1942 | Page |
| 2,380,431 A | 7/1945 | Harding |
| 2,399,375 A | 4/1946 | Mullins |
| 2,452,632 A | 11/1948 | McLeod |
| 2,541,496 A | 2/1951 | Busick, Jr. |
| 2,616,677 A | 11/1952 | Compton |
| 2,644,691 A | 7/1953 | Pohle |
| 2,660,253 A | 11/1953 | Davidson |
| 2,660,449 A | 11/1953 | MacPherson |
| 2,692,770 A | 10/1954 | Nallinger et al. |
| 2,914,127 A | 8/1955 | Ricouard |
| 2,777,528 A | 1/1957 | Jourdain |
| 2,942,676 A | 12/1957 | Kraus |
| 2,901,240 A | 8/1959 | Fikse |
| 2,935,309 A | 5/1960 | McCarthy |
| 3,078,941 A | 2/1963 | Baron |
| 3,113,661 A | 12/1963 | Linke et al. |
| 3,135,345 A | 6/1964 | Scruggs |
| 3,150,733 A | 9/1964 | Goebel |
| 3,249,168 A | 5/1966 | Klein |
| 3,255,836 A | 6/1966 | Hoppmann et al. |
| 3,265,145 A | 8/1966 | Beitzel |
| 3,334,849 A | 8/1967 | Bronder |
| 3,362,553 A | 1/1968 | Weinmann |
| 3,375,892 A | 4/1968 | Kraschnewski et al. |
| 3,446,301 A | 5/1969 | Thomas |
| 3,448,994 A | 6/1969 | King et al. |
| 3,490,786 A | 1/1970 | Ravenel |
| 3,493,064 A | 2/1970 | Wilson |
| 3,512,597 A | 5/1970 | Baron |
| 3,527,313 A | 9/1970 | Reimann |
| 3,528,341 A | 9/1970 | Rieschel |
| 3,576,225 A | 4/1971 | Chambers |
| 3,595,322 A | 7/1971 | Reimann |
| 3,612,201 A | 10/1971 | Smith |
| 3,638,747 A | 2/1972 | Althoff |
| 3,674,103 A | 7/1972 | Kiekhaefer |
| 3,734,220 A | 5/1973 | Smith |
| 3,754,361 A | 8/1973 | Branham |
| 3,765,499 A | 10/1973 | Harmala |
| 3,767,064 A | 10/1973 | Lutz |
| 3,767,224 A | 10/1973 | Schneeweiss |
| 3,796,276 A | 3/1974 | Maeda |
| 3,807,519 A | 4/1974 | Patch |
| 3,853,196 A | 12/1974 | Guest |
| 3,866,425 A | 2/1975 | Morrice |
| 3,866,835 A | 2/1975 | Dowd |
| 3,921,739 A | 11/1975 | Rich et al. |
| 3,951,225 A | 4/1976 | Schewenk |
| 4,014,399 A | 3/1977 | Ruder |
| 4,021,978 A | 5/1977 | Busse |
| 4,048,936 A | 9/1977 | Uchizono |
| RE29,541 E | 2/1978 | Russell |
| 4,135,340 A | 1/1979 | Cox |
| 4,206,935 A | 6/1980 | Sheppard et al. |
| 4,252,204 A | 2/1981 | Bishop |
| 4,290,495 A | 9/1981 | Elliston |
| 4,296,820 A | 10/1981 | Loftis |
| 4,324,077 A | 4/1982 | Woolslayer |
| 4,324,302 A | 4/1982 | Rabinovitch |
| 4,334,587 A | 6/1982 | Rangaswamy |
| 4,371,041 A | 2/1983 | Becker |
| 4,375,892 A | 3/1983 | Jenkins |
| 4,405,019 A | 9/1983 | Frisbee |
| 4,406,339 A | 9/1983 | Spencer |
| 4,423,560 A | 1/1984 | Rivinius |
| 4,489,954 A | 12/1984 | Yasui et al. |
| 4,491,449 A | 1/1985 | Hawkins |
| 4,555,032 A | 11/1985 | Mick |
| 4,655,467 A | 4/1987 | Kitzmiller et al. |
| 4,759,414 A | 7/1988 | Willis |
| 4,821,816 A | 4/1989 | Willis |
| 4,823,870 A | 4/1989 | Sorokan |
| 4,831,795 A | 5/1989 | Sorokan |
| 4,842,298 A | 6/1989 | Jarvis |
| 5,015,147 A | 5/1991 | Taylor |
| 5,178,406 A | 1/1993 | Reynolds |
| 5,245,882 A | 9/1993 | Kallenberger |
| 5,248,005 A | 9/1993 | Mochizuki |
| 5,398,396 A | 3/1995 | Sanders |
| 5,492,436 A | 2/1996 | Suksumake |
| 5,575,346 A | 11/1996 | Yberle |
| 5,600,905 A | 2/1997 | Kallenberger |
| 5,603,174 A | 2/1997 | Kallenberger |
| 5,613,444 A | 3/1997 | Ahmadian et al. |
| 5,749,596 A | 5/1998 | Jensen et al. |
| 5,794,723 A | 8/1998 | Caneer |
| 5,921,336 A | 7/1999 | Reed |
| 6,089,583 A | 7/2000 | Taipale |
| 6,202,774 B1 | 3/2001 | Claassen et al. |
| 6,203,247 B1 | 3/2001 | Schellstede |
| 6,345,831 B1 | 2/2002 | deMarcellus |
| 6,474,926 B2 | 11/2002 | Weiss |
| 6,554,145 B1 | 4/2003 | Fantuzzi |
| 6,554,305 B2 | 4/2003 | Fulks |
| 6,581,525 B2 | 6/2003 | Smith |
| 6,612,781 B1 | 9/2003 | Jackson |
| 6,651,991 B2 | 11/2003 | Carlstedt et al. |
| 6,820,887 B1 | 11/2004 | Riggle |
| 6,857,483 B1 | 2/2005 | Dirks |
| 6,962,030 B2 | 11/2005 | Conn |
| 7,182,163 B1 | 2/2007 | Gipson |
| 7,308,953 B2 | 12/2007 | Barnes |
| 7,357,616 B2 | 4/2008 | Andrews |
| 7,681,674 B1 | 3/2010 | Barnes et al. |
| 7,806,207 B1 | 10/2010 | Barnes et al. |
| 7,819,209 B1 | 10/2010 | Bezner |
| 7,882,915 B1 | 2/2011 | Wishart |
| 8,019,472 B2 | 9/2011 | Montero |
| 8,051,930 B1 | 11/2011 | Barnes et al. |
| 8,250,816 B2 | 8/2012 | Donnally |
| 8,468,753 B2 | 6/2013 | Donnally |
| 8,490,724 B2 | 7/2013 | Smith et al. |
| 8,490,727 B2 | 7/2013 | Smith et al. |
| 8,544,853 B2 | 10/2013 | Kanaoka |
| 8,556,003 B2 | 10/2013 | Souchek |
| 8,561,733 B2 | 10/2013 | Smith et al. |
| 8,573,334 B2 | 11/2013 | Smith |
| 8,646,549 B2 | 2/2014 | Ledbetter |
| 8,646,976 B2 | 2/2014 | Stoik |
| 8,839,892 B2 | 9/2014 | Smith et al. |
| 8,887,800 B2 | 11/2014 | Havinga |
| 9,004,203 B2 | 4/2015 | Smith |

(56) References Cited

U.S. PATENT DOCUMENTS

| | | | |
|---|---|---|---|
| 9,045,178 B2 | 6/2015 | Smith | |
| 9,096,282 B2 | 8/2015 | Smith et al. | |
| 9,415,819 B2 | 8/2016 | Vogt | |
| 9,463,833 B2 | 10/2016 | Smith et al. | |
| 9,533,723 B2 | 1/2017 | Smith et al. | |
| 9,751,578 B2 | 9/2017 | Smith | |
| 9,862,437 B2 | 1/2018 | Smith et al. | |
| RE46,723 E | 2/2018 | Smith et al. | |
| 9,938,737 B1* | 4/2018 | Garceau | B66F 7/14 |
| 2002/0175319 A1 | 11/2002 | Green | |
| 2002/0185319 A1 | 12/2002 | Smith | |
| 2004/0211598 A1 | 10/2004 | Palidis | |
| 2004/0240973 A1 | 12/2004 | Andrews | |
| 2006/0027373 A1 | 2/2006 | Carriere | |
| 2006/0213653 A1 | 9/2006 | Cunningham | |
| 2009/0000218 A1 | 1/2009 | Lee | |
| 2009/0188677 A1 | 7/2009 | Ditta | |
| 2009/0200856 A1 | 8/2009 | Chehade | |
| 2009/0283324 A1 | 11/2009 | Konduc | |
| 2010/0224841 A1 | 9/2010 | Liljedahl | |
| 2010/0252395 A1 | 10/2010 | Lehtonen | |
| 2011/0072737 A1 | 3/2011 | Wasterval | |
| 2011/0114386 A1 | 5/2011 | Souchek | |
| 2012/0219242 A1 | 8/2012 | Stoik | |
| 2013/0153309 A1 | 6/2013 | Smith et al. | |
| 2013/0156538 A1 | 6/2013 | Smith et al. | |
| 2013/0156539 A1 | 6/2013 | Smith et al. | |
| 2013/0240300 A1* | 9/2013 | Fagan | B66F 7/10 187/210 |
| 2013/0277124 A1 | 10/2013 | Smith et al. | |
| 2014/0014417 A1 | 1/2014 | Smith et al. | |
| 2014/0054097 A1 | 2/2014 | Bryant | |
| 2014/0158342 A1 | 6/2014 | Smith | |
| 2014/0161581 A1 | 6/2014 | Smith et al. | |
| 2014/0262562 A1 | 9/2014 | Eldib | |
| 2014/0299564 A1 | 10/2014 | Lin | |
| 2015/0053426 A1 | 2/2015 | Smith et al. | |
| 2015/0125252 A1* | 5/2015 | Berzen Ratzel | B62D 12/02 414/800 |
| 2015/0166134 A1 | 6/2015 | Trevithick | |
| 2015/0166313 A1* | 6/2015 | Knapp | B66F 7/025 254/89 R |
| 2015/0239580 A1 | 8/2015 | Valenzuela | |
| 2016/0023647 A1 | 1/2016 | Saunders | |
| 2016/0176255 A1 | 6/2016 | Guiboche | |
| 2016/0221620 A1 | 8/2016 | Smith | |
| 2016/0297488 A1 | 10/2016 | Smith | |
| 2017/0021880 A1 | 1/2017 | Smith | |
| 2017/0022765 A1 | 1/2017 | Csergei | |
| 2017/0101144 A1 | 4/2017 | Higginbotham, II | |
| 2017/0327166 A1 | 11/2017 | Smith | |
| 2018/0072543 A1 | 3/2018 | Rucker | |
| 2018/0183362 A1* | 6/2018 | Jenner | B66F 3/46 |
| 2018/0346041 A1 | 12/2018 | Smith | |
| 2019/0016575 A1 | 1/2019 | Unger | |
| 2019/0048558 A1 | 2/2019 | Unger | |
| 2019/0152704 A1 | 5/2019 | Smith | |

FOREIGN PATENT DOCUMENTS

| | | |
|---|---|---|
| CA | 2798774 | 9/2015 |
| CA | 2798790 | 10/2015 |
| CH | 359422 | 1/1962 |
| CN | 1515477 | 7/2003 |
| CN | 101139069 | 3/2008 |
| CN | 102566573 | 12/2013 |
| CN | 105060161 | 11/2015 |
| CN | 105446271 | 3/2016 |
| CN | 106672113 | 5/2017 |
| CN | 107314000 | 11/2017 |
| DE | 2418411 | 10/1975 |
| DE | 4107314 | 9/1992 |
| EP | 469182 A2 | 10/1990 |
| GB | 2315464 | 2/1998 |
| WO | 2004103807 | 12/2004 |
| WO | 2006100166 | 9/2006 |
| WO | 2010136713 | 12/2010 |

OTHER PUBLICATIONS

Defendants' First Amended Answer, Affirmative Defenses, and Counterclaims to Plaintiffs Complain for Patent Infringement, Jun. 27, 2016, p. 9, section 16.

Defendants' Answer, Affirmative Defenses, and Counterclaims to Plaintiffs Complaint for Patent Infringement, Jun. 6, 2016, p. 6, Section 2.

Entro Industries, Inc. brochure "The Future of Rig Walkers", Jun. 2012; 4 pages.

Columbia Industries, LLC brochure "Kodiak Cub Rig Walking System", 2009; 4 pages.

Defendants' Second Amended Answer, Affirmative Defenses, and Counterclaims to Plaintiff's Complaint for Patent Infringement, Jul. 12, 2016, p. 9, Sections 15-18.

Defendant Hydraulic System, Inc.'s Preliminary Invalidity Contentions, Nov. 18, 2016, pp. 1-6.

Defendant Hydraulic System, Inc.'s Preliminary Invalidity Contentions, May 26, 2017, pp. 1-6.

Colby, Col. Joseph M., "Torsion-Bar Suspension", SAE Quarterly Transactions, vol. 2, No. 2, pp. 195-200, Apr. 1948.

Airstream Inc., "Airstream's New Dura-Torque Axle" Pamphlet.

Schwabe Williamson & Wyatt, PC, "Listing of Related Cases", Apr. 10, 2018, 2 pages.

\* cited by examiner

LIFTING LOADS WITH LIFTING DEVICES

This application claims priority to U.S. Provisional Application 62/531,742 filed Jul. 12, 2017, entitled AUTOMATIC LOAD DETECTION FOR A LOAD TRANSPORTING APPARATUS, the contents of which are hereby incorporated by reference in their entirety.

U.S. Pat. Nos. 8,490,724; 8,561,733; 8,839,892; 8,573,334; and 9,004,203 are all incorporated by reference in their entireties.

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

FIELD OF THE INVENTION

This disclosure relates generally to apparatuses for transporting a load, and more particularly to automatically detecting, raising, and moving loads.

BACKGROUND

Moving extremely heavy loads has generally been a complicated task because the large forces involved in lifting and transporting the heavy loads. When possible, large loads are often transported by disassembling or breaking up the load into multiple smaller loads. However, this break-down and subsequent reassembly process can be very time consuming, especially when a heavy load is only moved a small distance, or needs to be repositioned.

For heavy loads that need periodic movement or adjustment, devices commonly referred to as "walking machines" or "walkers" were developed. These machines typically move the heavy loads over small distances in incremental stages. Walking machines are particularly useful for moving large structures, such as oil rigs, which often times need to be moved in order to properly position them over pre-drilled wells in oil fields, or moved to a new location that is undergoing oil exploration.

Instead of using wheels driven by rotational forces to move heavy loads, walking machines typically use hydraulic lift cylinders to lift the load above a supporting surface, and then move or rotate the load relative to the supporting surface by transporting the load via rollers or tracks in the walking machines. U.S. Pat. No. 5,921,336 to Parker and U.S. Pat. No. 6,581,525 to Smith show two methods of using walking machines to move heavy loads, such as oil rig structures. The '525 patent shows elongated beams under several rollers and lift cylinders, which allow the load from the lift cylinders and rollers to be spread over a large area. However, these walking machines are relatively tall and therefore use relatively tall support load bearing frames to support loads. The height of the walking machines increases the overall cost of the transport system and limit which types of load bearing frames can be used for supporting the loads.

Loading inconsistencies may exist when picking up a large load at multiple points with walking machines. For example, there may be different ground compaction conditions at different lift points that require different lifting device extensions. These variable conditions require an operator to walk around the entire structure and manually control each individual lift point.

The operator may raise all lifting devices simultaneously until a first lifting device begins lifting the load off of the base surface. The operator then manually raises the remaining lifting devices currently not contacting the base surface. After all lifting devices are in contact with the base surface, the operator causes all lifting devices to lift all load points together to lift the load off of the base surface. This manual operation typically includes stopped periods between lifting all and lifting individual points that add a substantial amount of time to the stepping process.

DETAILED DESCRIPTION

As described above, walkers, or walking machines, are vehicles that transport heavy loads, such as entire oil well drilling rigs. Such loads weigh as much as several thousand tons and may be required to be sequentially positioned very precisely over spaced-apart well bores, for example. Embodiments of the present concept are directed to controlling walking apparatuses, such as walking machines, for moving heavy loads over small distances with the ability to fine tune the resultant position of the heavy load.

For ease of understanding, the terms, "walkers," "walking machines," "walking devices," and "walking apparatuses" are used interchangeably below. Walking apparatus or systems may include one or more walking machines. Additionally, a walking machine's subassembly of components that facilitate movement of the walking machine are referred herein as a "walking mechanism." Walking machines may incorporate one or more walking mechanisms, depending on the specific configuration of a walking machine.

FIGS. 1A-1F show a control system 100 that streamlines the process of lifting a structure consistently on a number of lift points. Control system 100 may include walking apparatus 115 that provide multiple lift points at different corners of a load 110. Walking apparatus are described in U.S. patent 008490724 which is incorporated by reference in its entirety.

Figure 1A:
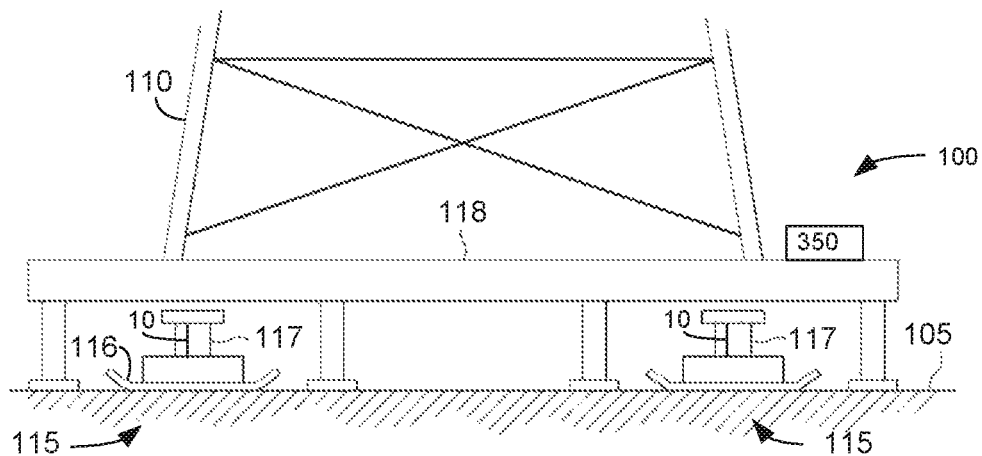
FIGS. 1A-1F show a stepping operation for transporting apparatus.
Figure 1B:
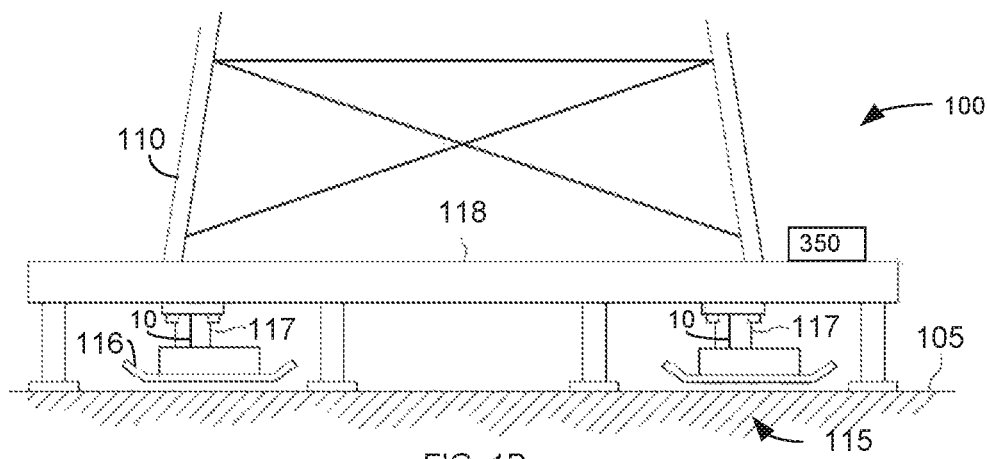

Referring to FIG. 1A, walking apparatus 115 are positioned on a base surface 105 below or adjacent to a load 110. Referring to FIG. 1B, the walking apparatus 115 may attach to load 110 and in a retracted position may extend above base surface 105. There are many possible connection variations for connecting the walking apparatus 115 to load 110. For example, walking apparatus 115 may attach to a load bearing frame 118 that supports load 110.

Figure 1C:
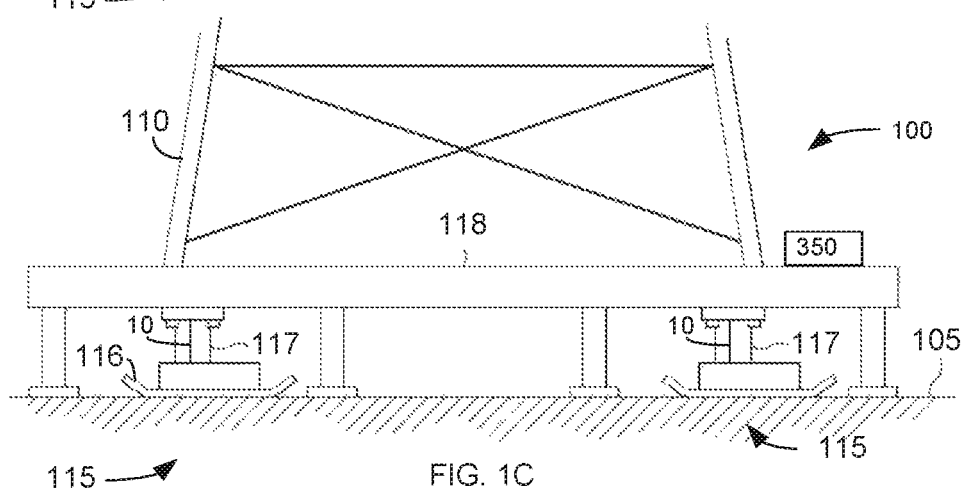

Referring to FIG. 1C, walking apparatus 115 are operated so that a portion of feet 116 contact base surface 105. The walking apparatus 115 may be operated substantially simultaneously, or may be operated in intervals depending on the conditions of base surface 105 and loading by load 110.

Figure 1D:
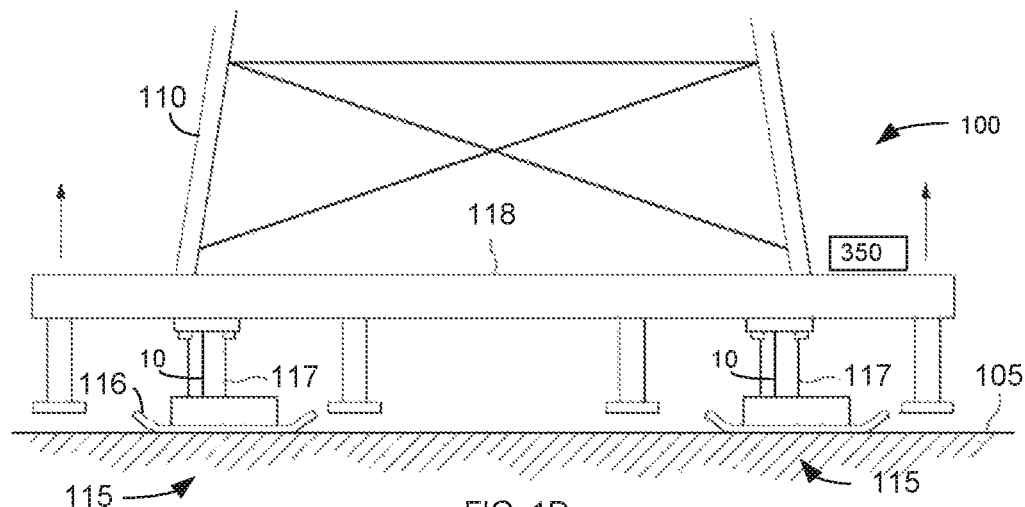

Referring to FIG. 1D, walking apparatus 115 are operated to lift load 110 above base surface 105. Walking apparatus 115 again may be operated substantially simultaneously to lift the load 110, or may be operated in intervals depending on the ground and load conditions associated with the desired move.

Figure 1E:
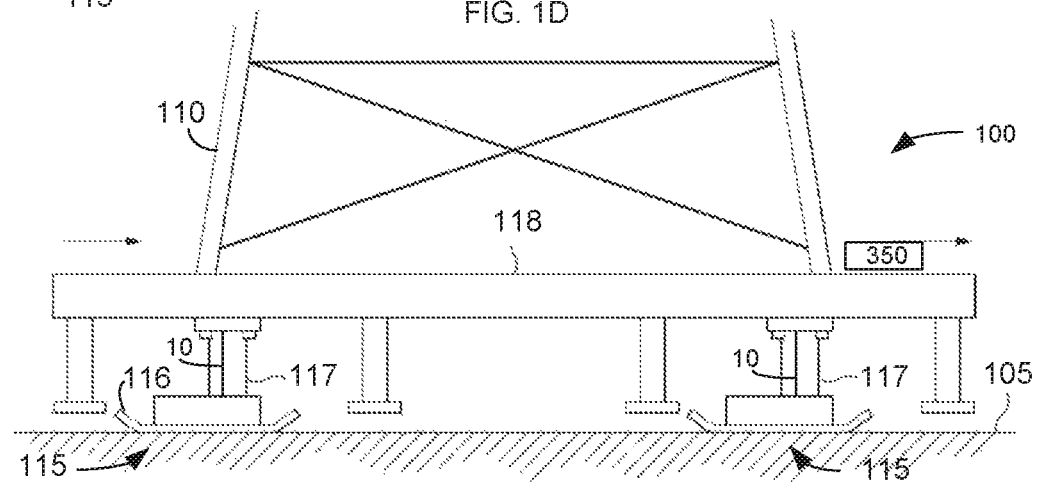

Referring to FIG. 1E, walking apparatus 115 are operated to move load 110 to the right. Although FIG. 1E shows load 110 being moved to the right, walking apparatus 115 can be operated to move load 110 in a variety of directions depending on the desired final location.

Figure 1F:
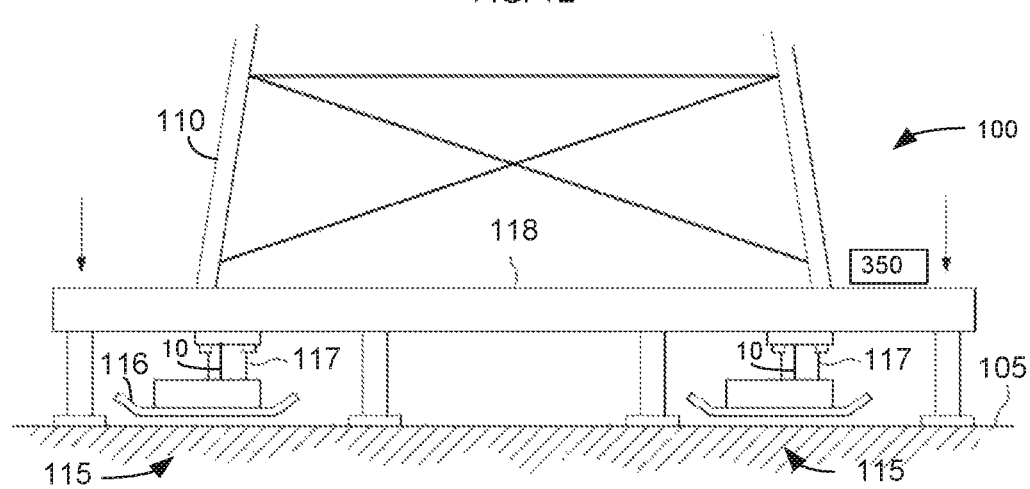

Referring to FIG. 1F, walking apparatus 115 are operated to lower load 110 to base surface 105 and to raise feet 116 of walking apparatus 115 above base surface 105. That is, after load 110 is positioned on base surface 105, walking apparatus 115 are further operated so that they are raised above base surface 105. Here, the connection between walking apparatus 115 and load 110 support the walking apparatus 115 when raised above base surface 105.

After walking apparatus 115 are raised above base surface 105, they are further operated to be repositioned for another movement walking step, such as by moving feet 116 to the right in a position as shown in FIG. 1B. That is support feet 116 and related structures are moved to the right while raised above base surface 105. After walking apparatus 115 have been repositioned, they are lowered to base surface 105 as shown in FIG. 1C. This completes a single walking cycle, and further walking cycles or steps can be performed by repeating the steps described above with respect to FIGS. 1D to 1F.

Auto Lift

An operator may perform the following manual operations during the step cycles described above.

Lifting Phase 1. Extend a lifting device 117 for each walking apparatus 115 to a point where each support foot 116 begins to press into base surface 105.

Lifting Phase 2. Extend each lifting device 117 to transfer load 110 from load-bearing frame 118 to lifting device 117 resulting in a loaded state.

Lifting Phase 3. Extend each lifting device 117 a similar amount of displacement resulting in a lifted state. In the lifted state, as shown in FIGS. 1D and 1E, load-bearing frame 118 is lifted up off of ground surface 105.

Control system 100 automates and improves phase 2 of the stepping operation. An operator previously had to visually observe each walking apparatus 115 and stop the extension of each lifting device 117 when load-bearing frame 118 started to lift off base surface 105. Visually observing each walking apparatus 115 requires the operator to walk around load 110 and view all lift points. Due to the nature of lifting an uneven load 110 on a relatively irregular and soft base surface 105 such as rig mats on ground, each lifting device 117 could require a different amount of extension in order to lift the entire load-bearing frame 118 and load 110 off base surface 105.

A computer 350 and displacement sensors 10 are used in control system 100 to automate all three lift phases described above. One of sensors 10 is used during phase 2 to sense the weight of load 110 being transferred to individual lifting devices 117. In phase 2, computer 350 may determine when each lifting device 117 is in a loaded state by comparing a current load slope to a maximum load slope.

Computer 350 may calculate the current load slope by dividing a change in load by a change in lifting device displacement. Computer 350 then may compare the current load slope to the maximum load slope. If the current load slope is greater than the max load slope, computer 350 may assign the current load slope as the maximum load slope. If the current load slope is less than the maximum load slope, computer 350 calculates a load slope ratio by dividing the current load slope by the maximum load slope. Computer 350 compares the load slope ratio to a load slope threshold. If the load slope ratio is less than the load slope threshold, computer 350 may determine lifting device 117 is in a loaded state and stop extending lifting device 117. When all lifting devices 117 reach the loaded state, computer 350 may move to lifting phase 3 and uniformly extend all lifting devices 115 by the same amount. In this lifting state, load bearing frame 118 is lifted evenly above base surface 105.

The following terms are for explanation purposes and it should be understood that other terms and definitions may be use to further describe these elements.

Lift Point: A point on a structure where a walking apparatus lifts a structure.

Load: May refer to any amount of substance or weight lifted or supported by an individual walking apparatus or may refer to an entire amount of substance or weight lifted by all of the walking apparatus.

Walking Apparatus: An apparatus configured to move a load over a base surface.

Load-Bearing Frame: The frame holding the load. The walking apparatus may lift the load through the load-bearing frame. This is often either a frame that the entire load sits on or a smaller frame that is welded to the load or pinned to the load. In other example, the walking apparatus may lift the load directly.

Lifting Device: A device used for lifting the load off of the base surface. Typically, a hydraulic cylinder, but can be anything capable of creating a displacement that can support a load such as, but not limited to, a pneumatic cylinder, rack and pinion gear with a motor, screw with a motor, or any combination of the above apparatus with linkage that redirects the useful motion.

Support Foot: A relatively stiff surface area used to distribute the load on a lifting device over an area on the base surface. Often used to lower the ground bearing pressure on the base surface.

Base Surface: The surface under the load and load-bearing frame.

Control System: A system of sensors, controllable devices, and a computer used to automatically manipulate a device.

Computer: A device programmable to manipulate outputs based on information from inputs. The program operated by the computer may include logic which repeatedly produces a known and specific output based on an input.

Remote control device: A device used to receive inputs for the computer and display outputs from the computer. In one embodiment, the remote control device is wireless. Inputs may include angle set points, valve position set points, steering mode, automatic mode, or autowalk direction and magnitude. Outputs may be light emitting diodes (LEDs) or display data on a screen.

Load Sensor: A device used to measure, either directly or indirectly, the load on a lifting device. One example embodiment includes a pressure sensor that measures pressure on the bore side of a jack cylinder. The computer converts the bore pressure to a load applied on the diameter of the bore. Other example embodiments may include a sensor that measures displacement of a component with a known load vs displacement relationship. The computer may convert this displacement to a load based on the load vs displacement relationship.

Displacement Sensor: A device used to measure, either directly or indirectly, the displacement of a lifting device. One example embodiment consists of a displacement sensor that detects the position of a cylinder rod in the lifting device. Other example, embodiments may consist of optical sensors, ultrasonic sensors, string sensors, or rotary sensors with a mechanical conversion from a linear position.

Change in Load: A difference in load over a specific unit of measure, like time or distance, typically determined by taking the difference between two load values. In one example embodiment, the load is determined by a pressure transducer in the lifting device cylinder and converted by a known cylinder bore area to get an equivalent load.

Change in Displacement: A difference in displacement of the lifting device over a specific unit of measure, like time or pressure typically determined by taking the difference between two displacement values. In one example embodiment, the displacement is taken from the displacement sensor and converted from millimeters (mms) to inches.

Load Slope: A ratio of the change in load over the change in displacement over a specific unit of measure like time.

Current Load Slope: A slope identifying the relationship between load and displacement in the lifting device. If a curve is generated with displacement on a horizontal axis and load on a vertical axis, the current load slope may be the slope of the curve. In this example embodiment, the current load slope is generated by dividing the change in lifting device load by the change in lifting device displacement. Other example embodiments may include a curve generated by the two values and taking a first derivative of the curve.

Max Load Slope: A maximum value of the load slope. A program executed by the computer may compare the current load slope to the maximum load slope. The computer may overwrite the maximum load slope with the current load slope if the current load slope is larger than the maximum load slope.

Load Slope Ratio: The ratio between the current load slope and the max load slope. The ratio is 100% if the current load slope is equal to the max load slope.

Load Slope threshold: A value of the load slope ratio used to determine when the lifting device is loaded.

Loaded State: A state at which the lifting device has adequately lifted its portion of the load. To determine what an adequate portion of a load is, the load is lifted evenly off of the base surface and the loads recorded. A percentage of the load is taken to determine an adequate load for the lifting device. Typically, the center of the structure is still on the ground during a loaded state.

Lifted State: A state at which the entire load has been lifted above the base surface.

Figure 2:
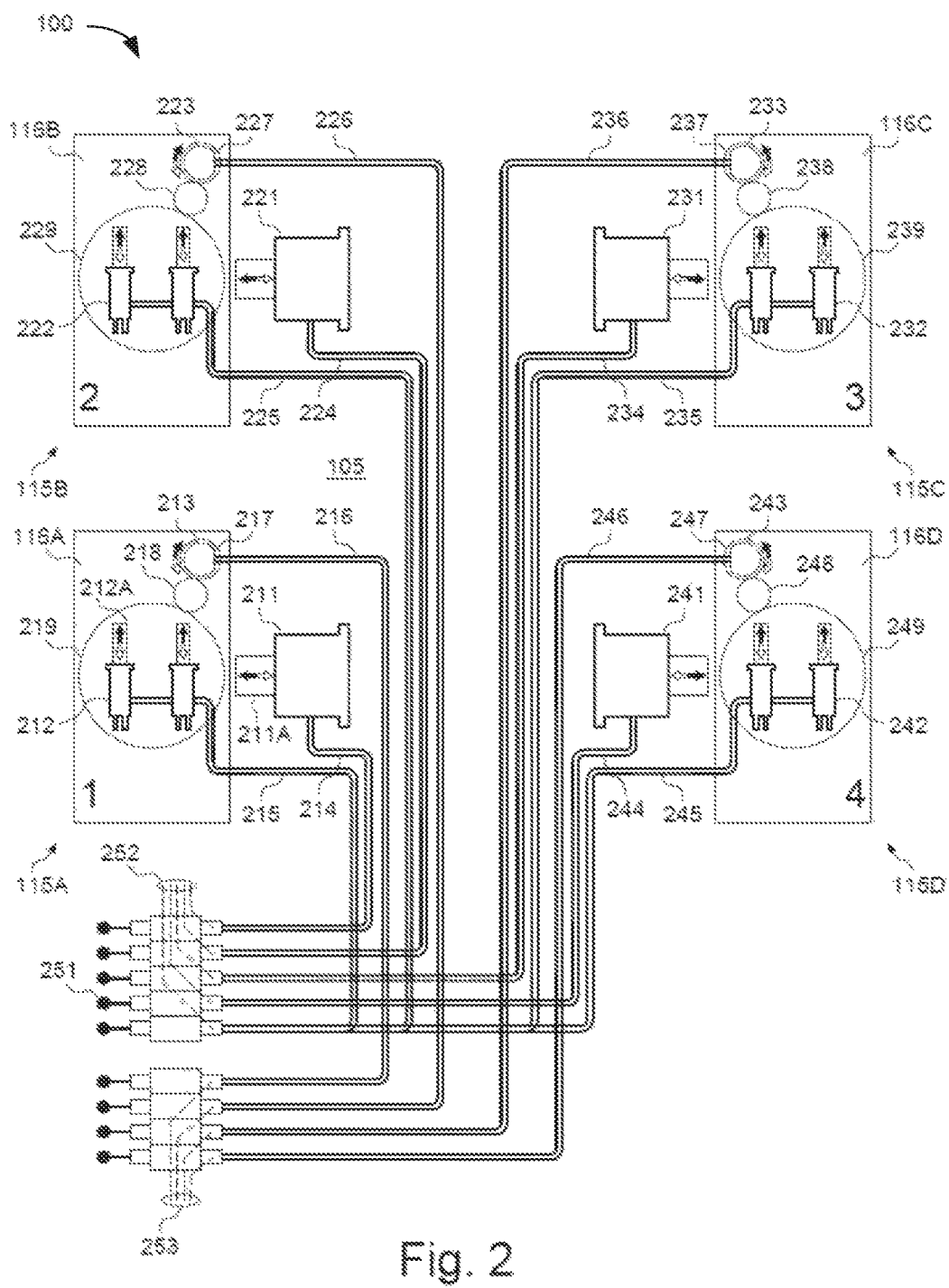
FIG. 2 shows a control system used for raising a load.

FIG. 2 shows control system 100 in more detail. This example embodiment shows hydraulic valves, cylinders, and motors with interconnected hydraulic lines. Other embodiments may include electrical controls or mechanical controls.

Figure 3:
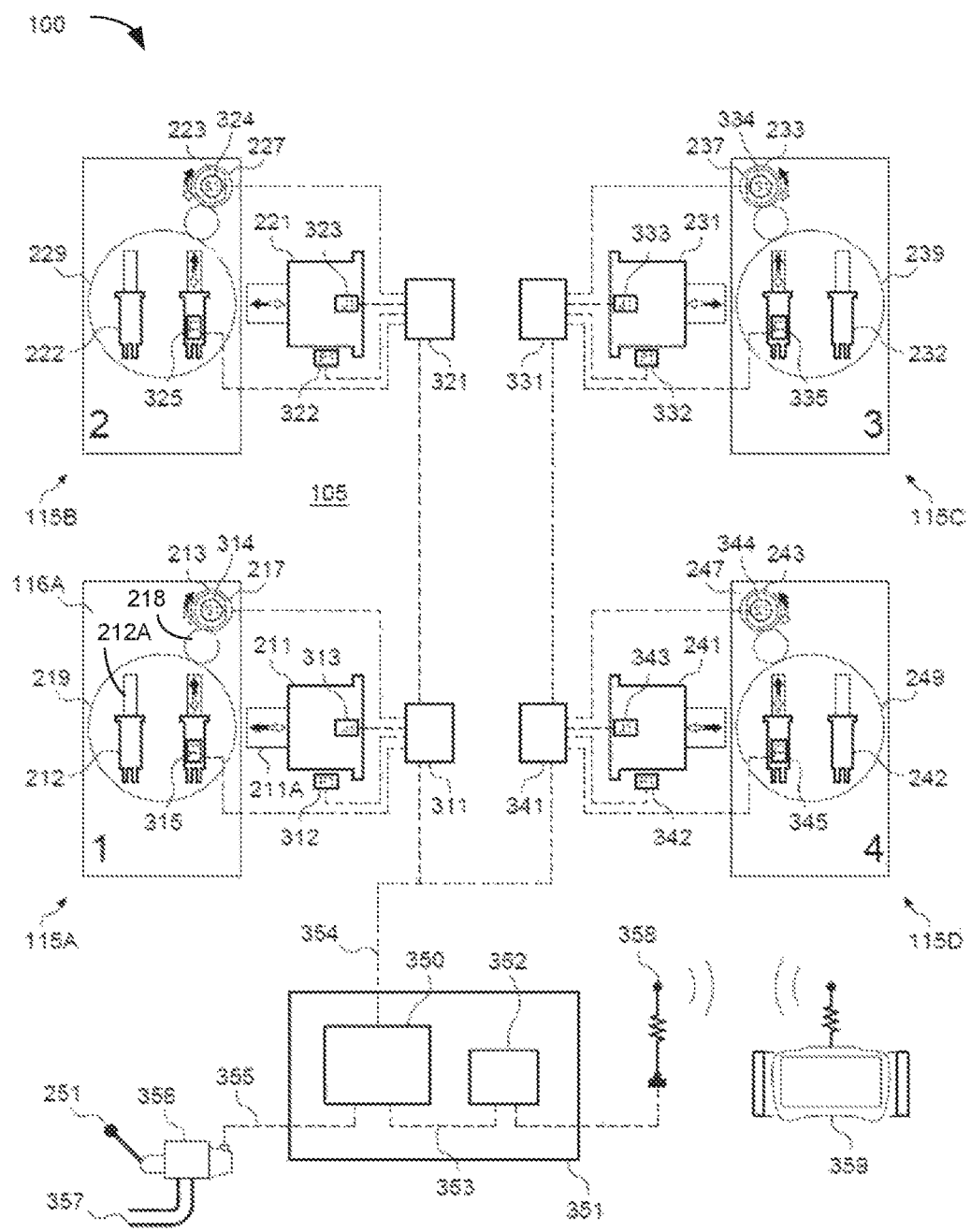
FIG. 3 shows sensors used in the control system of FIG. 2.

Lifting devices 211, 221, 231, and 241 in FIGS. 2 and 3 correspond to lifting devices 117 in FIGS. 1A-1F. Lifting devices 211, 221, 231, and 241 are shown in sideways horizontal positions in the schematics of FIGS. 2 and 3 for explanation purposes. However, it should be understood that lifting devices 211, 221, 231, and 241 are typically arranged as shown by the lifting devices in FIGS. 1A-1F to extend and retract vertically to lift and lower load bearing frame 118 and attached load 110.

Walking apparatus 115A may use lifting device 211 to lift up and lower a lift point 1 on the load. In one example lifting device 211 may include a hydraulic cylinder 211A, similar to that shown in lifting mechanism 720 of U.S. Pat. No. 8,561,733. A translation device 212 may include two hydraulic cylinders 212A that move support foot 116A relative to the load resulting in a translation of lift point 1 relative to the base surface when lifting device 211 is in a loaded state. One example, embodiment of translation device 212 may include hydraulic cylinders used in travel mechanism 860 of U.S. Pat. No. 8,561,733.

A steering device 213 rotates an orientation of translation device 212 relative to the load resulting in a translation of walking apparatus 115A in a specific direction relative to base surface 105 when lifting device 211 in a loaded state. In one example, steering device 213 is a hydraulic motor.

A lifting control signal 214 causes lifting device 211 to extend or retract lifting or lowering foot 116A relative to the load. In one example, lifting control signal 214 may include a set of two hydraulic lines to pressurize the bore or the rod side of cylinder 211A in lifting device 211. Bore side pressure may extend cylinder 211A and rod side pressure may retract cylinder 211A.

A translation control signal 215 may cause translation device 212 to extend or retract and translate (move) foot 116A relative to the load. In one example embodiment, control signal 215 may include a set of hydraulic lines that pressurize the bore or the rod side of cylinders 212A in translation device 212. A bore side pressure may extend cylinders 212A and a rod side pressure may retract cylinders 212A.

A steering control signal 216 may cause steering device 213 to rotate clockwise or counterclockwise. This adjusts the orientation of translation device 212 with respect to the load. In one embodiment, steering control signal 216 may include a set of hydraulic lines. One of the hydraulic lines may rotate steering device 213 in a clockwise rotation while the other hydraulic line may rotate steering device 213 in a counter-clockwise rotation.

A drive pinion 217 may transmit a torque causing steering device 213 to move into an idle state. An idle pinion 218 may maintain a clockwise rotation of a bull gear 219 for a clockwise rotation of drive pinion 217. Rotation of bull gear 219 rotates the orientation of translation device 212.

Walking apparatus 115B-115D operate similar to walking apparatus 115A and may include lifting devices 221, 231, and 241, respectively, that operate similar to lifting device 211. Walking apparatus 115B-115D may include translation devices 222, 232, and 242, respectively that operate similar to translation device 212. Walking apparatus 115B-115D may move feet 116B-116D, respectively, relative to the load resulting in a translation of lift points 2, 3, and 4, respectively, relative to base surface 105 when lifting device 221, 231, and 241, respectively, are in a loaded state.

Walking apparatus 115B-115D may include steering devices 223, 233, and 243, respectively that operate similar to steering device 213. Steering devices 223, 233, and 243 may rotate orientations of translation device 222, 232, and 242, respectively, relative to the load.

Walking apparatus 115B-115D may include lifting control signals 224, 234, and 244, respectively that operate similar to lifting control signal 214 extending or retracting cylinders in lifting devices 221, 231, and 241, respectively. This results in lifting or lowering feet 116B, 116C, and 116D, respectively.

Walking apparatus 115B-115D may include translation control signals 225, 235, and 245, respectively, that operate similar to translation control signal 215 and cause cylinders in translation devices 222, 232, and 242 to extend or retract and correspondingly translate (move) feet 116B, 116C, and 116D, respectively, relative to the load.

Walking apparatus 115B-115D may include steering control signals 226, 236, and 246, respectively, that operate similar to steering control signal 216 and cause steering devices 223, 233, and 243, respectively, to rotate clockwise or counterclockwise. This rotation adjusts the orientation of the translation devices on bull gears 229, 239, and 249, respectively, with respect to the load.

Walking apparatus 115B-115D may include drive pinions 227, 237, and 247, respectively that operate similar to drive pinion 217 and transmit a torque causing steering devices 223, 233, and 243 to move into idle states. Idle pinions 228, 238, and 248 may operate similar to idle pinion 218 and maintain a clockwise rotation of bull gears 229, 239, and 249, respectively, for a clockwise rotation of drive pinions 227, 237, and 247, respectively.

Control handles 251 may create manual input signals for inputting to any of the control signal lines. Computer control signals 252 are used for controlling the translation and lifting in walking apparatus 115A-115D and are generated by computer 350 shown in FIGS. 1A-1F and FIG. 3 and may be converted into hydraulic control signals as described above. Computer control signals 253 are also used for steering walking apparatus 115A-115D and are generated by computer 350 and may be converted into hydraulic control signals as described above.

In one example embodiment, computer 350 may generate pulse width modulation (PWM), Voltage, current or digital signals 252 and 253 that proportionally control the displacement of valves that produce the hydraulic control signals.

FIG. 3 shows an overview of the sensors and processors used in control system 100. One example embodiment shows an electrical network bus 354 connecting a control panel 350 to multiple different sensors P1, T1, S1, and J1 located on each walking apparatus 115A-115D. Other example embodiments may consist of direct electrical lines connected to each sensor P1, T1, S1, and J1, wireless signals communicating with sensors P1, T1, S1, and J1, or hydraulic or mechanical feedback from the lifting, transition, and/or rotation devices in walking apparatus 115A-115D.

Walking apparatus 115A, 115B, 115C, and 115D may include associated sub-panels 311, 321, 331, and 341, respectively that connect associated sensors P1, J1, S1, and T1 to network bus 354. Other example embodiments may include tee's or separate bus lines 354 running to each sensor.

The explanation below may refer to sensors P1, T1, J1, and S1 associated with a specific walking apparatus 115. It should be understood that the sensors P1, T1, J1, and S1 may be connected and operate similarly in any of walking apparatus 115A, 115B, 115C, and 115D. Sensors P1, J1, S1, and T1 in walking apparatus 115A are alternatively referred to by reference numbers 312, 313, 314, and 315, respectively. Sensors P1, J1, S1, and T1 in walking apparatus 115B are alternatively referred to by reference numbers 322, 323, 324, and 325, respectively. Sensors P1, J1, S1, and T1 in walking apparatus 115C are alternatively referred to by reference numbers 332, 333, 334, and 335, respectively. Sensors P1, J1, S1, and T1 in walking apparatus 115D are alternatively referred to by reference numbers 342, 343, 344, and 345, respectively.

Referring to walking apparatus 115A, pressure sensor 312 senses the pressure on lifting device 211. The sensed pressure is converted into a load value by program logic run by processor 350 based on the area of the bore side of cylinder 211A. Other example embodiments may include load sensors directly measuring load between lifting device 211 and the load or between lifting device 211 and base surface 105. Another example embodiment may measure deflection of members coupled to lifting device 211 and configured to identify the load carried by lifting device 211.

Lifting device displacement sensor 313 senses displacement of lifting device 211. This example embodiment shows sensor 313 embedded inside lifting device 211 and directly measuring the displacement of cylinder 211A. Other example embodiments may include external linear displacement sensors, rotary sensors connected to a rack and pinion, optical distance sensors, ultrasonic distance sensors, or string pot sensors.

Steering device sensor 314 senses the orientation of steering device 213. This example embodiment shows a rotary position sensor 314 mounted on the back of steering device 213 which is coupled to bull gear 219 through idle pinion gear 218. Other example embodiments may include a linear position sensor coupled to bull gear 219 through a chain or cable that wraps around bull gear 219, an optical sensor counting teeth on bull gear 219, or a rotary position sensor mounded directly to bull gear 219.

A translation device sensor 315 senses the position of translation device 212. In one example embodiment, a linear displacement sensor 315 is mounted inside translation device 212 and senses the position of cylinders 212A inside of translation device 212. Other embodiments may include other types of sensors measuring either directly or indirectly the extension position of translation device 212. Another example embodiment may include sensors that detect cylinders 212A in translation device 212 when fully extended or fully retracted.

As mentioned above, pressure sensors 322, 332, and 342 in walking apparatus 115B-115D, respectively, may operate similar to pressure sensor 312 in walking apparatus 115A. Displacement sensors 323, 333, and 343 in walking apparatus 115B-115D, respectively, may operate similar to displacement sensor 313 in walking apparatus 115A. Steering device sensors 324, 334, and 344 in walking apparatus 115B-115D, respectively, may operate similar to steering device sensor 314 in walking apparatus 115A. Translation device sensors 325, 335, and 345 in walking apparatus 115B-115D, respectively, may operate similar to translation device sensor 315 in walking apparatus 115A.

Control panel 351 houses some of the electrical equipment used in control system 100. Microcontroller 350 uses preprogrammed logic to control walking apparatus 115A-115D based on inputs from any of sensors P1, J1, S1, and T1. A wireless receiver 352 receives and sends information back and forth between microcontroller 350 and a remote control device 359.

Communication link 353 connects wireless receiver 352 with microcontroller 350. In one example embodiment, communication link 353 may be a controller area network (CAN) connection. Other embodiments may include direct data lines.

Communication link 354 connects microcontroller 350 with sensors P1, J1, S1, and T1 in walking apparatus 115A-115D. As mentioned above, communication link 354 may comprise a network line or bus running between sensors P1, J1, S1, and T1 in walking apparatus 115A-115D and microcontroller 350. Other embodiments may include separate data lines directly connected to each sensor identifying individual voltage, current, and/or digital information. In another embodiment, communication link 354 may include wireless signals shared between sensors P1, J1, S1, and T1 and microcontroller 350.

Communication link 355 may connect microcontroller 350 with control device 356. Data on communication link 355 may inform control device 356 how to control lifting devices 211, 221, 231, and 241; translation devices 212, 222, 232, and 242; and steering devices 213, 223, 233, and 243. In one embodiment, microcontroller 350 and control device 356 may communicate via pulse width modulation (PWM) signals. In other embodiments, any of control device 356, microcontroller 350, remote control device 359, and/or sensors P1, J1, S1, and T1 may communicate via a network, such as a local area network (LAN), universal serial bus (USB) network, wireless WiFi network, CAN bus, or a wide area network (WAN) alternatively referred to as the Internet. Or may communicate with digital, or analog voltage or current signals Control lines 357 from control device 356 may send control information received from microprocessor 350 or manual controls 251 to lifting devices 211, 221, 231, and 241; translation devices 212, 222, 232, and 242; and steering devices 213, 223, 233, and 243. In one example, control lines 357 include hydraulic lines which control hydraulic pressure and flow to each of the devices.

Antenna 358 is used to receive wireless signals transmitted between receiver 352 and remote control device 359. In one example, antenna 358 receives and transmits wireless signals, such as infrared (IR), Bluetooth, radio, WiFi, etc. Other embodiments may include wires directly connected between remote control device 359 and electrical components in control panel 351.

Remote control device 359 receives inputs from an operator for controlling control system 100. In one example, remote control device 359 is a hand held unit. In other example embodiments, remote control device 359 may mount directly onto control panel 351 or onto some other components in control system 100.

Remote control device 359 may include buttons, touch screen, paddles, etc. that an operator may use to input control information into control system 100. A display screen in remote control device 359 may receive and display information associated with control system 100. Wireless receiver 352 may convert control signals received from remote control device 359 into network messages to microcontroller 350. Microcontroller 350 then may control lifting devices 211, 221, 231, and 241; translation devices 212, 222, 232, and 242; and steering devices 213, 223, 233, and 243 based on the network messages and data received from sensors P, T, S, and J.

Figure 4:
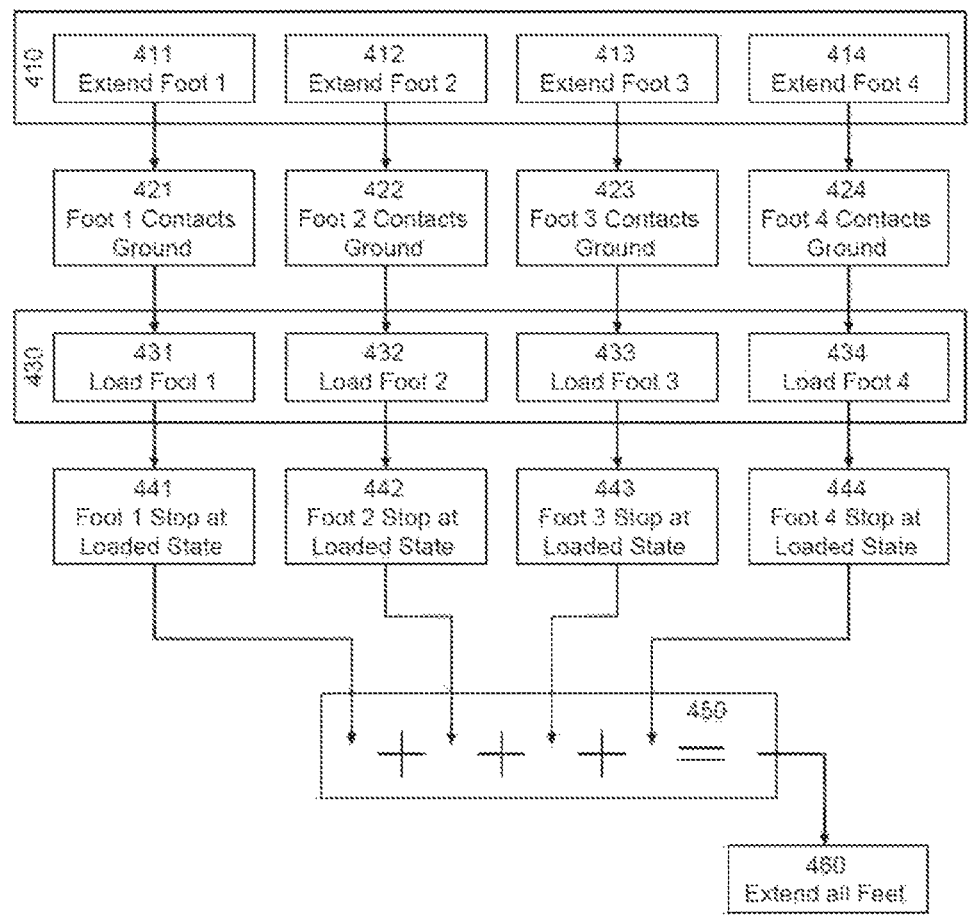
FIG. 4 shows a process for lifting a load.

FIG. 4 shows a flow chart depicting an example of how the control system may control the lifting devices when jacking up a load. The control system may extend the lifting devices on each corner of the load independently until all lifting devices are loaded. After all corners are loaded, the control system may extend all of the lifting devices together to evenly lift the load off of the base surface.

In initial state 410, the control system extends the lifting devices from a fully retracted state until the feet attached to the lifting devices initially touch the base surface. In this example, there are four lifting devices with four associated feet 1-4. In operations 411-414, the control system extends lifting devices for feet 1-4, respectively. In operations 421-424, the control system continues to extend the lifting devices until feet 1-4, respectively, contact the base surface or ground.

Transition state 430 extends the lifting devices into the base surface transferring some of the load from the support frame to the lifting devices. Operations 431, 432, 433, and 434 continue to extend feet 1-4, respectively, into the base surface transferring more of the load on the load bearing frame to the associated lifting devices.

Operations 441, 442, 443, and 444 independently stop each of feet 1-4, respectively, from extending further into the base surface when the associated lifting devices reach loaded states. Determining the loaded states of the lifting devices is described in more detail below. Operation 450 detects when all four feet 1-4 reach the loaded state. Operation 460 then extends all four lifting devices together by similar amounts to lift the load evenly above the base surface.

Figure 5:
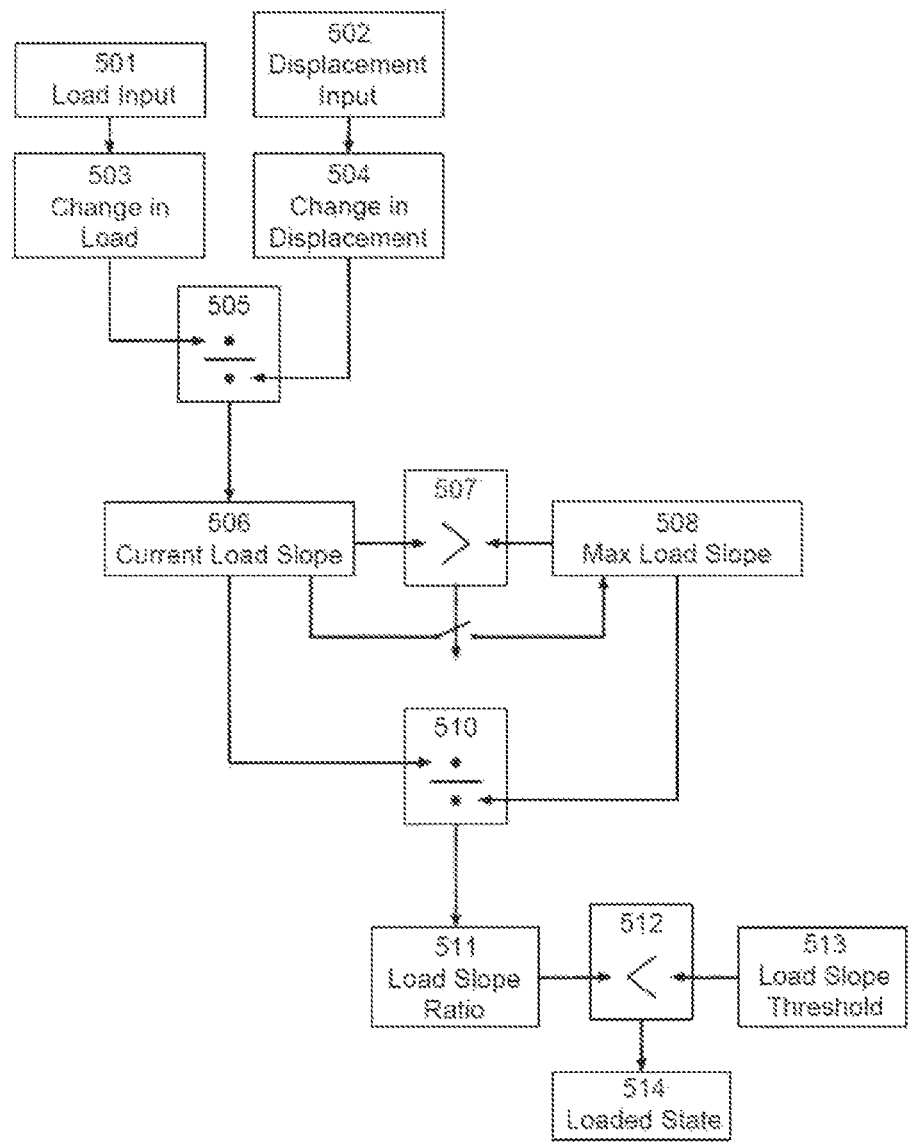
FIG. 5 shows a process for determining when a lifting device reaches a loaded state.

FIG. 5 shows in more detail a process for detecting loaded states of the lifting devices. In operation 501 the control system receives inputs from the load sensors indicating an amount of load on the lifting devices. As explained above, the control system may receive a hydraulic pressure value and convert the hydraulic pressure value into a load value. In another example, the control system may receive a load value directly from the load sensor. In operation 503, the control system determines or measures the current load and subtracts the current load on the lifting device from a previously determined load on the lifting device to calculate a change in load.

In operation 502, the control system receives inputs from the displacement sensors indicating an amount of displacement for the lifting devices. In operation 504, the control system subtracts the current amount of lifting device displacement from a previous measured amount of lifting device displacement to calculate a change in displacement.

In operation 505, the control system divides the change in load by the change in displacement. In operation 506, the control system uses the ratio calculated in operation 505 between the change in load and the change in displacement as the current load slope.

In operation 507, the control system compares the current load slope calculated in operation 506 with a maximum load slope stored in memory in operation 508. Operation 507 may assign and store the current load slope as a new maximum load slope when the current load slope calculated in operation 506 is equal to or greater than the current maximum load slope stored in operation 508.

In operation 510, the control system divides the current load slope by the maximum load slope. In operation 511, the control system uses the result of operation 510 as a load slope ratio of current load slope to max load slope.

Operation 512 compares the load slope ratio from operation 511 with a load slope threshold read from memory in operation 513. Operation 514 identifies the lifting device as being in a loaded state when the load slope ratio is less than the load slope threshold.

The maximum load slope may be stored or reset to a default value at pre-determined points. In one embodiment the default value may be determined to be 0.

In one embodiment, the pre-determined point of reset may be after the walking system steps forward to a new location.

In one example, loaded state 514 indicates an amount of increased load on the lifting device compared with the amount of increased displacement of the lifting device such that subsequent extension of the lifting device would start lifting the load above the ground surface. In other words, the loaded state means the lifting device is substantially loaded such that additional extension by the lifting device does not substantially increase the load on the lifting device. A load slope ratio 511 above load slope threshold 513 may indicate that additional displacement of lifting device will, at least partially, compress the lifting device foot into the base surface.

As explained in more detail below, in one example it has been determined that a load slope ratio of around 0.45 or less reliably identifies the loaded state of the lifting device. A lower load slope threshold may be set around 0.2 and an upper load slope threshold may be set around 0.8.

Figure 6:
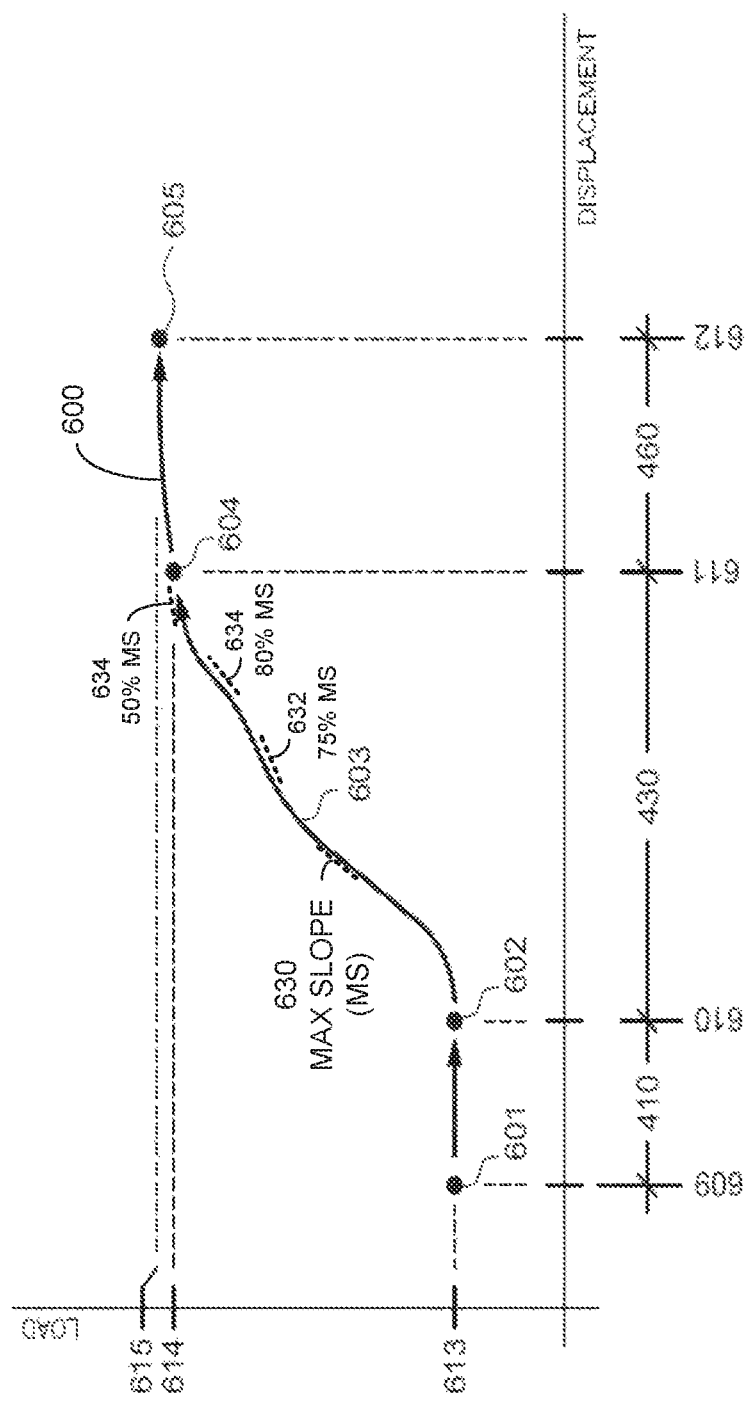
FIG. 6 shows a load displacement curve for a lifting device.

FIG. 6 shows a load vs displacement curve of a typical lifting device. The horizontal axis represents displacement of the lifting device and the vertical axis represents load on the lifting device. Load displacement curve 600 represents the load vs. displacement relationship for the lifting device.

A point 601 on load displacement curve 600 represents a retracted state where the lifting device foot is retracted into the frame suspended above the base surface. A point 602 represents the foot initially touching the base surface. Non-loaded state 410 exists between points 601 and 602 where extension of the foot does not increase the load on the lifting device. Point 604 indicates a loaded state where the load slope ratio drops below the load slope threshold. Transition state 430 extends between point 602 and point 604 where the control system individually extends the lifting devices until each reaches the loaded state.

Point 605 represents a lifted state where the lifting devices lift the load off of the base surface. Loaded state 460 extends between point 604 and 605 where the control system extends all lifting devices by the same amount for evenly lifting the load up off of the ground surface. After the lifting devices are loaded, then an auto leveling system may determine that the jacks need to lift at different rates to adjust the system to a level state using an inclinometer or another feedback device.

Point 609 on the horizontal displacement axis represents the amount of initial displacement of the lifting device when in the retracted state. Point 610 on the displacement axis represents the displacement when the foot of the lifting device makes initial contact with the base surface. The control system may consider this displacement position to correspond with zero displacement.

Point 611 on the displacement axis represents the displacement of the lifting device upon reaching the loaded state. Point 612 on the displacement axis represents the beginning of loaded state 460 where additional lifting device displacement starts lifting the load off the base surface.

Point 613 on the vertical load axis represents the load on the lifting device in the retracted state and corresponds with substantially no load on the lifting device. Point 614 on the load axis represents the load on the lifting device upon reaching the loaded state 460. Point 615 on the load axis represents the load on the lifting device in loaded state 460 which corresponds to the weight of the lift point of the load supported by the lifting device.

Figure 7:
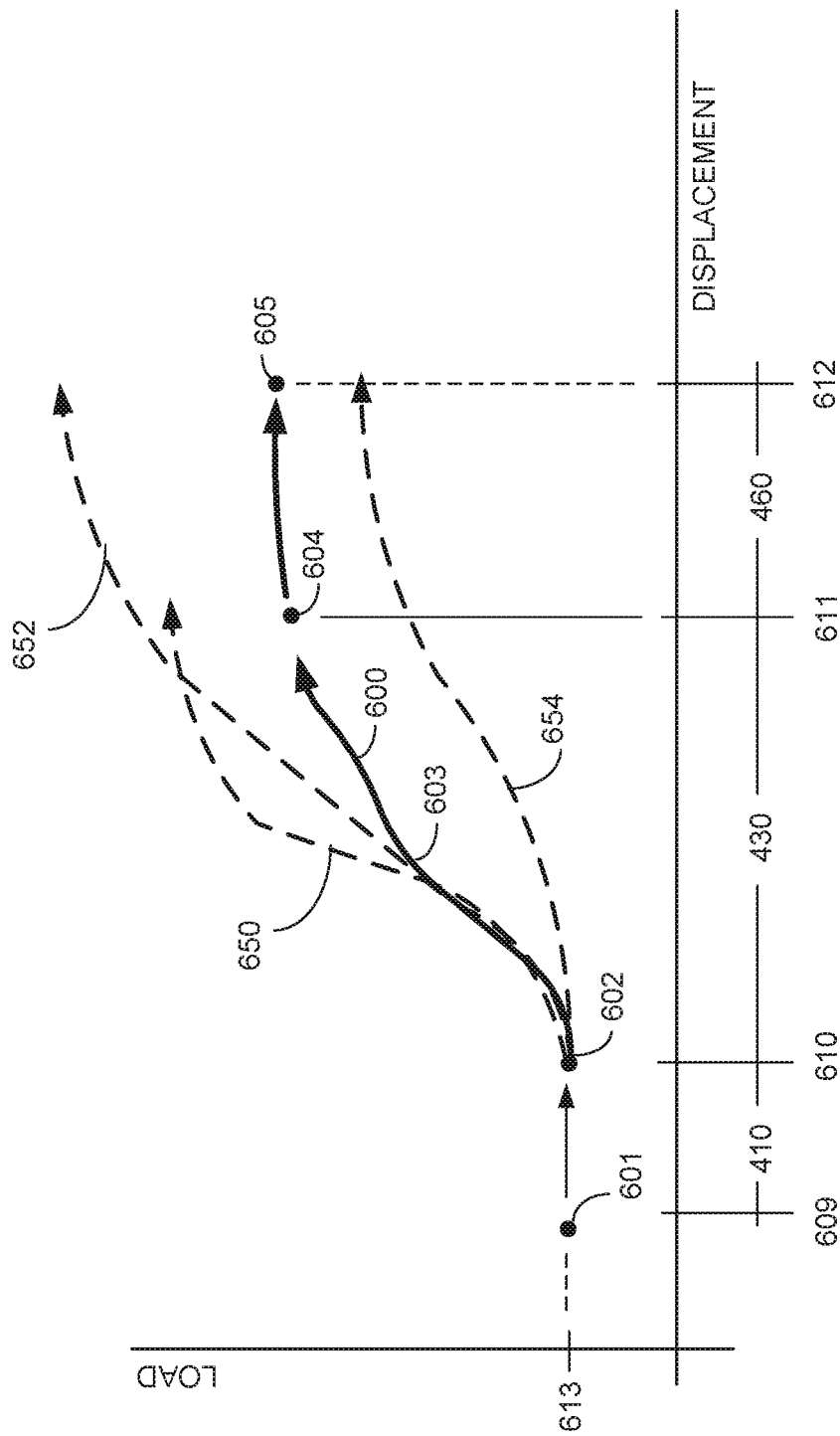
FIG. 7 shows different load displacement curves for different lifting device conditions.

FIG. 7 shows how the load displacement characteristics may change for different conditions. For example, the lifting device may generate a more gradual sloped load displacement curve 654 when located on softer ground. The lifting device may generate a steeper sloped load displacement curve 650 when located on a relatively hard ground surface. In other words, it may take less displacement for the lifting device to reach the loaded state after contacting the surface. The lifting device may generate a longer transition state in load displacement curve 652 when lifting more weight. For example, some lifting devices may lift more of the load than other lifting devices based on their locations underneath the load. These lifting devices may compress further into the base surface or bend the load bearing frame further and therefore require more displacement to lift that corner of the load off of the base surface.

Referring to FIGS. 6 and 7, the load displacement curves also may have non-linear knees 603 caused by irregularities in the soil, curving in the support structure, or any other irregular load transition. For example, the slope for a first portion 630 of curve 600 may increase, the slope in a next portion 632 of curve 600 may level out, and the slope for a next third portion 634 of curve 600 may increase again forming knee 603. A next portion 634 of load displacement curve 600 may level out again upon reaching loaded state 460.

The control system may identify loaded state 460 without falsely detecting loaded states in knee 603 or falsely detecting loaded states during the different conditions shown in FIG. 7. It was discovered that a load displacement slope of around 45% or less of the maximum load displacement slope likely indicates a substantially loaded lifting device. In one example, it was determined that a load displacement slope less than 70% of the maximum slope may reliably indicate the loaded state of the lifting device.

As explained above, the control system may replace the maximum load slope with the current load slope when the current load slope is greater than the maximum load slope. This allows the control system to use different maximum load slopes based on the ground and loading conditions associated with each individual lifting device.

Figure 8:
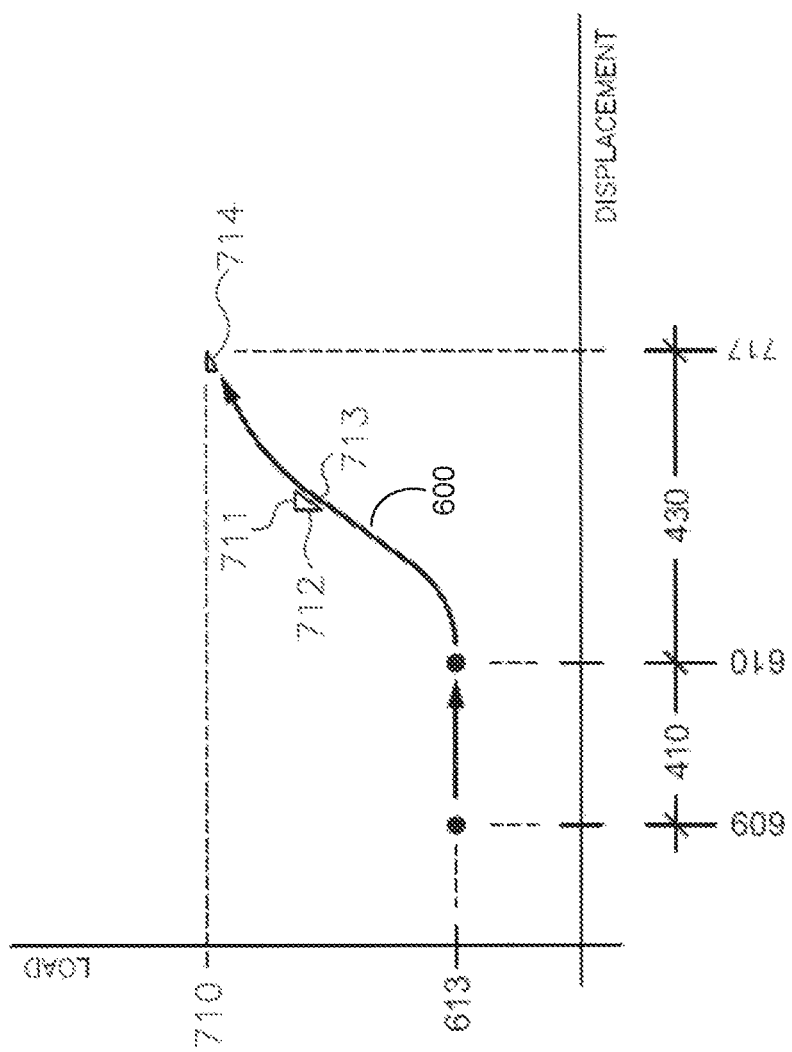
FIG. 8 shows how the load displacement curve is used for identifying a loaded lifting device.

FIG. 8 shows in more detail the load displacement curve 600 for a typical lifting device during transition state 430. Point 710 on the vertical load axis is the current load on the lifting device and point 717 on the horizontal displacement axis is the current displacement of the lifting device.

Segment 711 is the change in displacement of the lifting device and segment 712 is the change in load of the lifting device. Segment 713 represents the maximum load slope ratio representing the largest change in load vs. a given change in displacement. Segment 714 represents the current measured load slope for the lifting device.

As described above in FIG. 5, the control system may repeatedly compare the current load slope 714 with maximum load slope 713. For example, the control system may take load measurements for every 1/50,000 of an inch displacement of the lifting device. The control system identifies the lifting device as loaded when the load slope ratio between current load slope 714 and maximum load slope 713 is less than the load slope threshold.

Using the displacement ratio described above allows the control system to accurately determine lifting device loading without having to calculate precise pressure and displacement measurements. This allows the system to accurately determine the loaded state with variable load 110, without having to pre determine a specific load or displacement measurement. The process described above allows the control system to more quickly and accurately load up multiple lifting devices and then evenly lift loads off of base surfaces.

Measuring the lifting device load indirectly or directly also eliminates the need for proximity or displacement sensors to detect the precise lifting device distance from the base surface. In the oil industry, the base surface is often uneven and dirty. Some systems may by use optical sensors or proximity sensors to detect when specific load lift points are lifted off a base surface. These systems are subject to failure from intrusion and obstruction by dirt, debris, and liquids. Using the displacement ratio allows the control system to also accurately lift loads in a wider variety of soil, rigging, and loading conditions.

The control system and microcomputer described above may include or communicate with a personal computer (PC), a tablet, a Personal Digital Assistant (PDA), a cellular telephone, a smart phone, a web appliance, or any other machine or device capable of executing instructions 1006 (sequential or otherwise) that specify actions to be taken by that machine.

Computing devices used by the control system may include any collection of devices or circuitry that individually or jointly execute a set (or multiple sets) of instructions to perform any one or more of the operations discussed above. The computing device may be part of an integrated control system or system manager, or may be provided as a portable electronic device configured to interface with a networked system either locally or remotely via wireless transmission.

Processors used in the control system may comprise a central processing unit (CPU), a graphics processing unit (GPU), programmable logic devices, dedicated processor systems, micro controllers, or microprocessors that may perform some or all of the operations described above. The processors may also include, but may not be limited to, an analog processor, a digital processor, a microprocessor, multi-core processor, processor array, network processor, etc.

Some of the operations described above may be implemented in software and other operations may be implemented in hardware. One or more of the operations, processes, or methods described herein may be performed by an apparatus, device, or system similar to those as described herein and with reference to the illustrated figures.

The processors may execute instructions or "code" stored in any one of memories. The memories may store data as well. Instructions and data can also be transmitted or received over a network via a network interface device utilizing any one of a number of well-known transfer protocols.

Memories may be integrated together with the processing device, for example RAM or FLASH memory disposed within an integrated circuit microprocessor or the like. In other examples, the memory may comprise an independent device, such as an external disk drive, storage array, or any other storage devices used in database systems. The memory and processing devices may be operatively coupled together, or in communication with each other, for example by an I/O port, network connection, etc. such that the processing device may read a file stored on the memory.

Some memory may be "read only" by design (ROM) by virtue of permission settings, or not. Other examples of memory may include, but may be not limited to, WORM, EPROM, EEPROM, FLASH, etc. which may be implemented in solid state semiconductor devices. Other memories may comprise moving parts, such a conventional rotating disk drive. All such memories may be "machine-readable" in that they may be readable by a processing device.

"Computer-readable storage medium" (or alternatively, "machine-readable storage medium") may include all of the foregoing types of memory, as well as new technologies that may arise in the future, as long as they may be capable of storing digital information in the nature of a computer program or other data, at least temporarily, in such a manner that the stored information may be "read" by an appropriate processing device. The term "computer-readable" may not be limited to the historical usage of "computer" to imply a complete mainframe, mini-computer, desktop, wireless device, or even a laptop computer. Rather, "computer-readable" may comprise storage medium that may be readable by a processor, processing device, or any computing system. Such media may be any available media that may be locally and/or remotely accessible by a computer or processor, and may include volatile and non-volatile media, and removable and non-removable media.

Computing devices used in the control system can further include a video display, such as a liquid crystal display (LCD) or a cathode ray tube (CRT) and a user interface, such as a keyboard, mouse, touch screen, etc. All of the components of the computing device may be connected together via a bus and/or network.

The control system described above can use dedicated processor systems, micro controllers, programmable logic devices, or microprocessors that perform some or all of the operations. Some of the operations described above may be implemented in software, such as computer readable instructions contained on a storage media, or the same or other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

References above have been made in detail to preferred embodiment.

Examples of the preferred embodiments were illustrated in the referenced drawings. While preferred embodiments where described, it should be understood that this is not intended to limit the invention to one preferred embodiment. To the contrary, it is intended to cover alternatives, modifications, and equivalents as may be included within the spirit and scope of the invention as defined by the appended claims.

Having described and illustrated the principles of the invention in a preferred embodiment thereof, it should be apparent that the invention may be modified in arrangement and detail without departing from such principles. Claim is made to all modifications and variation coming within the spirit and scope of the following claims.

The invention claimed is:

1. A method of using a control system to detect a loaded state for a lifting device, comprising:
   receiving a current load value from a load sensor corresponding to a load on the lifting device;
   comparing the current load value with a previously received load value to determine a change in load;
   receiving a current displacement value with a displacement sensor corresponding to a displacement of the lifting device;
   comparing the current displacement value with a previously received displacement value to determine a change in displacement;
   comparing the change in load with the change in displacement to determine a current load slope; and
   identifying the lifting device in a loaded state based on the current load slope.

2. The method of claim 1, including identifying the lifting device in the loaded state based on a comparison of the load slope to a load slope threshold.

3. The method of claim 1, including:
   delaying or slowing further extension of the lifting device after reaching the loaded state until other lifting devices lifting the load reach the loaded state; and
   raising some or all of the lifting devices after all of the lifting devices reach the loaded state.

4. The method of claim 3, including automatically starting a stepping operation to move the load after lifting the load off of the base surface.

5. The method of claim 1, including:
   identifying a maximum load slope of the lifting device;
   comparing the current load slope with the maximum load slope;
   calculating a load slope ratio between the current load slope and the maximum load slope;
   comparing the load slope ratio with a load slope threshold; and
   identifying the lifting device in the loaded state based on the comparison of the load slope ratio with the load slope threshold.

6. The method of claim 5, including identifying the lifting device in the loaded state when the load slope ratio is less than the load slope threshold.

7. The method of claim 5, including:
   comparing the current load slope to the maximum load slope; and
   replacing the maximum load slope with the current load slope when the current load slope is greater than the maximum load slope.

8. The method of claim 1, wherein the lifting device includes a cylinder that extends between the load and a base surface and the load sensor measures an amount of pressure applied by the load against the cylinder.

9. The method of claim 8, wherein the displacement sensor measures a distance the cylinder extends out of the lifting device.

10. A control system configured to lift a load above a base surface, the control system comprising:
    a lifting device configured to lift a load-bearing frame supporting the load;
    a load sensor configured to detect a load value applied to the lifting device by the load;
    a displacement sensor configured to detect a displacement value corresponding to a displacement of a cylinder in the lifting device; and
    a processor configured to detect a loaded state of the lifting device based on a comparison of the load value with the displacement value, wherein the processor is further configured to:
      compare a currently measured load value from the load sensor with a previously measured load value from the load sensor to derive a change in load value;
      compare a currently measured displacement value from the displacement sensor with a previously measured displacement value from the load sensor to derive a change in displacement value; and
      detect the loaded state of the lifting device based on a comparison of the change in load value with the change in displacement value.

11. The control system of claim 10, wherein the processor is further configured to:
    calculate a current load slope based on a ratio of the change in load value and the change in displacement value;
    calculate a load slope ratio between the current load slope and a maximum load slope for the lifting device; and
    identify the loaded state of the lifting device based on the load slope ratio.

12. The control system of claim 11, wherein the processor is further configured to detect the loaded state of the lifting device when the current load slope is less than a predetermined percentage of the maximum load slope.

13. The control system of claim 11, wherein the processor is further configured to:
    replace the maximum load slope with the current load slope when the current load slope is greater than the maximum load slope; and
    calculate the load slope ratio for subsequently calculated current load slopes based on the replaced maximum load slope.

14. The control system of claim 10, wherein the processor is further configured to:
    temporarily stop displacement of the lifting device until other lifting devices located underneath the load bearing frame reach the loaded state; and
    raise all of the lifting devices in unison to lift the load bearing frame off of a base surface after all of the lifting devices reach the loaded state.

15. The control system of claim 10, including a remote control device configured to control how the processor activates the lifting device.

16. A computer program for controlling how lifting devices lift a load, the computer program comprising a set of instructions operable to:
    receive current load values identifying loads on the lifting devices;
    identify changes in load on the lifting devices based on changes between the current load values and previously received load values;
    receive current displacement values identifying displacements of the lifting devices;
    identify changes in displacement of the lifting devices based on changes between the current displacement values and previously received displacement values; and
    identify the different lifting devices which are in a loaded state based on a comparison of the changes in the load with the changes in the displacement.

17. The computer program of claim 16, wherein the set of instructions are further operable to:
    identify load slopes for the lifting devices based on a comparison of the changes in load with the changes in displacement;
    compare the load slopes for the lifting devices to a load slope threshold; and
    identify the different lifting devices which are in the loaded state based on the comparison of the load slopes with the load slope threshold.

18. The computer program of claim 17, wherein the set of instructions are further operable to:
    identify maximum load slopes for the lifting devices while lifting the load;
    calculate load slope ratios between the load slopes and the maximum load slopes;
    compare the load slope ratios with the load slope threshold; and
    identify different ones of the lifting devices in the loaded state based on the comparison of the load slopes with the load slope threshold.

19. The computer program of claim 18, wherein the set of instructions are further operable to:
    identify any of the lifting devices with load slopes larger than the maximum load slopes;

replace the maximum load slopes with the larger load slopes; and use the replaced maximum load slopes to calculate the load slope ratios for subsequently identified load slopes.

20. The computer program of claim 16, wherein the set of instructions are further operable to:

stop extending the lifting devices identified in the loaded state;

identify when all of the lifting devices are in the loaded state; and resume extending all of the lifting devices in unison after all of the lifting devices reach the loaded state.

\* \* \* \* \*